United States Patent [19]
Hyde

[11] 3,835,889
[45] Sept. 17, 1974

[54] EXPANDABLE PIPELINE PLUG

[75] Inventor: Walter E. Hyde, Duncan, Okla.

[73] Assignee: Halliburton Company, Duncan, Okla.

[22] Filed: Mar. 31, 1972

[21] Appl. No.: 240,071

[52] U.S. Cl............. 138/93, 15/104.06 R, 138/90, 166/191, 166/202
[51] Int. Cl............................................. F16l 55/12
[58] Field of Search........... 138/93, 91, 90; 73/49.8, 73/49.1, 49.5, 40.5; 15/104.06 R; 166/191, 202

[56] References Cited
UNITED STATES PATENTS

| | | | |
|---|---|---|---|
| 1,181,984 | 5/1916 | Arni........................ | 138/90 |
| 1,221,733 | 4/1917 | Henderson................ | 138/93 X |
| 1,812,943 | 7/1931 | Granger.................... | 138/93 X |
| 2,493,962 | 1/1950 | Gray........................ | 166/191 X |
| 2,672,199 | 3/1954 | McKenna.................. | 166/202 X |
| 2,796,937 | 6/1957 | Haines et al............... | 166/202 X |
| 3,032,108 | 5/1962 | Bielstein.................. | 166/191 X |
| 3,561,490 | 2/1971 | Little....................... | 138/90 |
| 3,690,348 | 9/1972 | Patterson.................. | 138/97 |
| 3,693,408 | 9/1972 | Hyde........................ | 73/49.8 |
| 3,695,301 | 10/1972 | Pittman................... | 138/97 |

Primary Examiner—William I. Price
Assistant Examiner—Steven M. Pollard
Attorney, Agent, or Firm—John H. Tregoning

[57] ABSTRACT

A pipeline leak locator plug having an expanding seal means responsive to hydrostatic pressure differential, a seal body with elastomeric sealing cups and a pair of hydrostatically operated valves; one valve being positioned between the expanding seal means and the seal body and the other valve positioned on the opposite side of the seal body. The valves operate in response to hydrostatic pressure in the pipeline and cooperate to allow tye leak locator plug to be flowed down the line to a desired position and the expanding seal means to be activated, thereby dividing the section of pipeline into two fluidically sealed units whereby the location of a leak in the pipeline can be determined.

9 Claims, 4 Drawing Figures

EXPANDABLE PIPELINE PLUG

BACKGROUND OF THE INVENTION

The use of pipelines as a means for transporting liquid and gaseous products is becoming widespread. Pipelines are presently the prime means of transporting petroleum products and other similar raw materials. Most of the natural gas used in this country is also transported by pipeline. Products commonly moved by this means of transportation include crude oil, gasoline, jet fuel, water, steam, cement, plastics, acids, and such unlikely fluids as milk and beer.

Of course all of these fluids must be pumped under high pressures to obtain sufficient movement between shipping and receiving points. In order to prevent loss of fluids and possible contamination of the material, the pipeline must remain intact and fluid tight at all times and leaks must be quickly located and repaired.

When the products being shipped by pipeline are highly flammable and explosive, such as petroleum products, the detection and quick repair of leaks is imperative to prevent a fire or explosion possibly causing loss of life and/or property damage.

As a precautionary measure, pipelines which are to carry explosive products as well as pipelines handling other contaminable fluids, are tested for leaks after they have been installed but prior to their first use. They are afterwards checked periodically and also checked when a known leak has occurred or a leak is suspected.

In the case of large high pressure pipelines the testing operation can prove to be quite costly, often running as high as 50 to 100,000 dollars for lengthy lines.

A commonly used procedure for testing an underground pipeline is to find two widely separated points on the pipeline exposed to the surface where valves are or may be located. If such points are not available the pipeline must be excavated at each point and a valve installed in the line by cutting and welding. At a point approximately half-way between the two valves, the line is excavated and a plug or blind flange is inserted into the line, once again by cutting and welding. A fluid such as distilled water is then pumped into the two isolated halves of the pipeline and pressured up and then the pressure is monitored in each section over a period of time to determine if either or both sections have a leak. The process is repeated by halving each section and then halving each half until the location of the leak is narrowed down sufficiently to locate the leak. This procedure is costly and time consuming as each location of a blind flange involves uncovering the line, cutting into it, placing a blind in it and then rewelding. After testing, all blinds must be removed which is as troublesome as their installation.

An alternative to installing blinds, in the pipeline which is an improvement over such technique, involves freezing a bridge across the pipeline. This procedure obviates the necessity of cutting the line and welding in a blind flange, then recutting and rewelding when removing the flange. However, freezing a bridge in a pipeline is fairly slow because of the difficulty in freezing across the complete diameter of some large pipelines.

In addition, forming a freeze plug in a pipeline requires that the line be uncovered for each plug or bridge to be installed in the line. Cooling apparatus is also required for the application of the freezing medium to the pipeline.

A plugging device which can be actuated to isolate sections of a pipeline without the necessity of uncovering and cutting the pipeline or applying a freezing medium to the pipeline has long been needed.

Such a plugging device is provided by the present invention which can be flowed down a pipeline, actuated by remotely controlled means into sealing engagement with the pipeline, held there indefinitely, and then moved forward or backward to a new position in the line.

DESCRIPTION OF THE PREFERRED EMBODIMENTS

Figure 1:
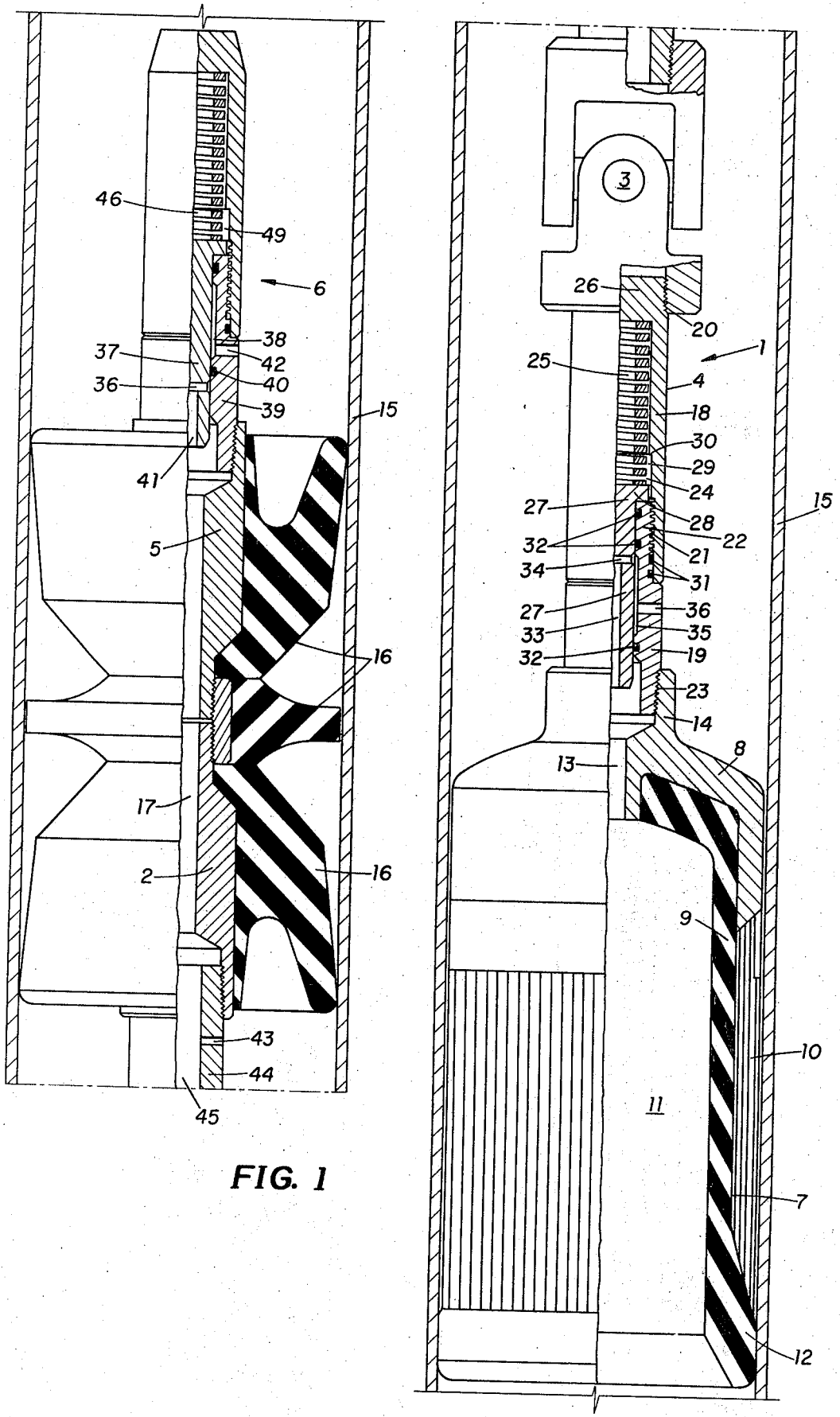
FIG. 1 is a partial cross-sectional view of the seal plug of the present invention as it appears when being flowed down the pipeline.
Figure 2:
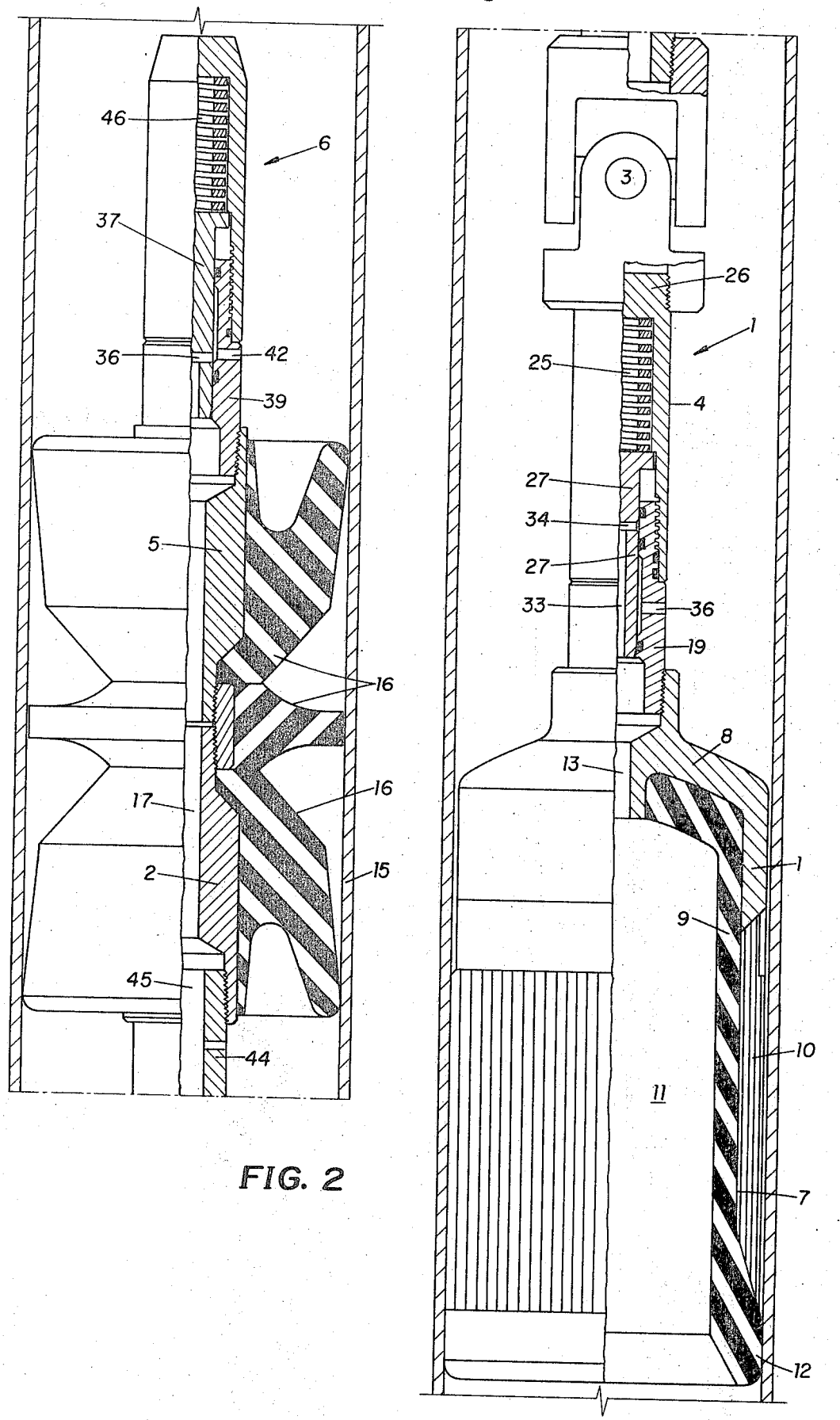
FIG. 2 is a partial cross-sectional view of the seal plug after it has been flowed to position in the pipeline and expanded into sealing engagement with the line.
Figure 3:
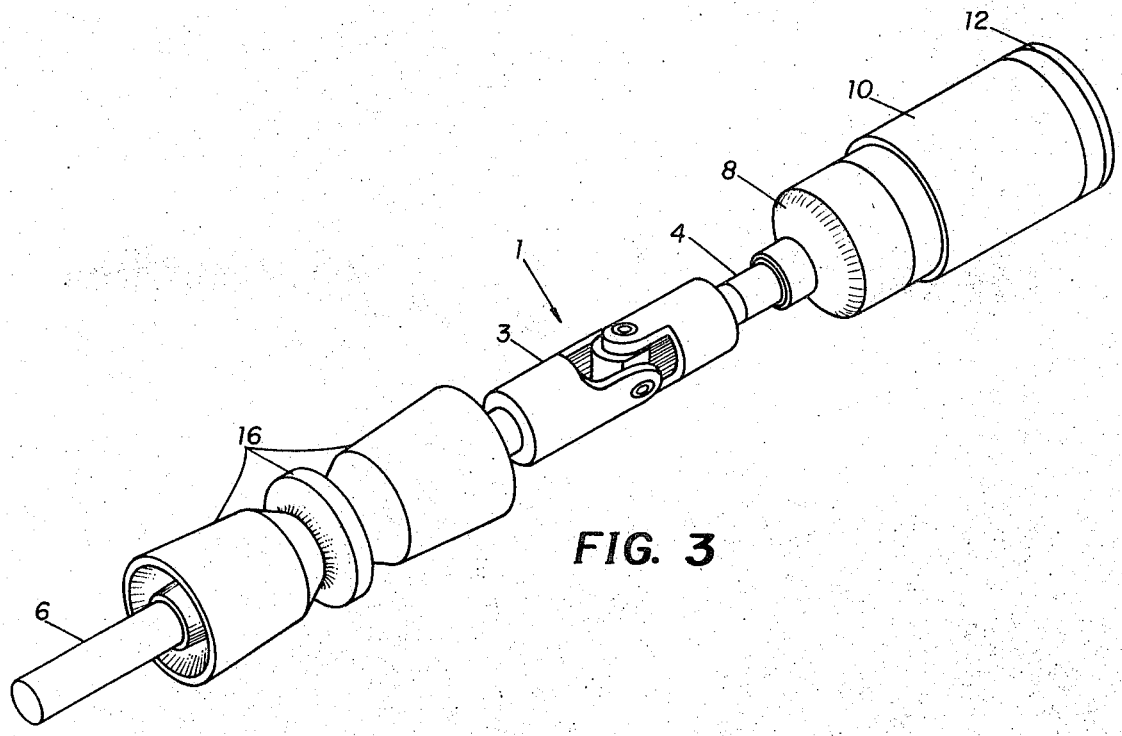
FIG. 3 is an isometric view of the sealing plug outside of the pipeline.

In FIGS. 1 and 2, the leak locator plug 1 is shown having a sealing member 2 connected by a flexible connection 3 to a central valve 4. Attached to the left or downstream end 5 of sealing member 2 is the front valve 6. Connected to the right or upstream end of central valve 4 is expandable seal means 7 consisting of rigid cylindrical head 8, elastomeric casing 9, and rigid ribs 10. Casing 9 is partially encased by and firmly attached to rigid head 8. Ribs 10 are also attached to head 8 and may be partially embedded in casing 9. Casing 9 has an open bore portion 11 and terminates in sealing cup 12. Head 8 has bore passage 13 therethrough and threaded collar 14 for attaching to central valve 4.

Although FIGS. 1 and 2 illustrate the pipeline and the plug in a vertical position, this is for convenience in drawing only and it is emphasized that the normal disposition of the pipeline is generally horizontal and for purposes of description the plug will be described as though in a horizontal position with front valve 6 to the left and expandable seal means 7 to the right.

Expandable seal means 7 is capable of being pulled through a pipeline and then can be sealingly engaged with the interior of the line in fluidically sealed and mechanically anchored relationship by creating a pressure differential across the sealing means. In order to actuate the plug, the higher pressure must be on the right side of the seal means 7 as illustrated in FIG. 1 and FIG. 2, and the lower pressure must be to the left. Operation of the expandable sealing means is similar to that of the device disclosed in U.S. Pat. No. 3,353,565, and is achieved when a pressure differential is applied across sealing cup 12. The high pressure exists in bore portion 11, and low pressure exists around ribs 10 between the expandable member and pipeline 15. The fluidic seal is achieved by seal cup 12 and the anchor is set when casing 9 expands outward in response to the high pressure in bore 11, engaging the ribs 10 with the inner surface of pipeline 15. This engagement provides a highly effective frictional anchor preventing axial movement of the locator plug within the pipeline.

The motive force for moving the plug through the pipeline is applied through a pressure differential acting on one or more elastomeric sealing cups 116 fixedly attached to seal member 2. Seal member 2 is substantially cylindrical in shape and has a bore passage 17 providing fluid communication therethrough.

Sealing cups 16 engage the inner surface of pipeline 15 and fluidically seal a cross-section of the pipeline.

Valves 4 and 6 are substantially identical spring-loaded, hydrostatically operated sliding mandrel valves which provide a means of first applying a pressure differential only to the sealing cups 16 for flowing the plug into the pipeline and then applying a pressure differential only to seal means 7 to anchor and seal the plug in the pipeline.

Valve 4 comprises a spring housing 18 attached to a mandrel housing 19. Spring housing 18 is tubular and has means at one end for connecting to swivel connection 3 and means at opposite end for connecting to mandrel housing 19. In this embodiment the connecting means consist of threaded ends 20 and 21. Mandrel housing 19 contains threaded end 22 which matches the threaded end 21 of housing 18. At the opposite end, housing 19 has threaded end 23 for connecting the housing 19 to threaded collar 14.

Housing 18 is provided with an open central bore portion 24 which is at a predetermined pressure such as atmospheric pressure, and within the chamber formed by bore portion 24 is a preloaded coil spring 25 which abuts at one end on cap plate 26 of housing 18 and at the other end abuts piston mandrel 27 which is telescopically arranged within housing 19. Mandrel 27 has annular shoulder 28 projecting radially outward into annular recess 29 formed in housing 18. Annular shoulder 28 limits longitudinal travel of mandrel 27 within housing 18 and 19 by abutting, in the extended position, end 22 of housing 19 and abutting in contracted position, shoulder 30 of recess 29. Annular seals 32 located in recesses in housing 19 provide fluid seal between mandrel 27 and mandrel housing 19.

Mandrel 27 has a bore passage 33 passing partially through the mandrel along its central axis. Bore passage 33 fluidically communicates with one or more ports 34 in mandrel 27 which in turn communicate with inner annular recess 35 and one or more ports 36 in mandrel housing 19. Thus, when valve 4 is open as in FIG. 1 no pressure differential exists across seal means 7, and therefore casing 9 remains relaxed and the plug can be flowed easily down the pipeline.

In a low pressure fluid environment, coil spring 25 is strong enough to bias valve 4 into a continuous open relationship to prevent a pressure differential from arising across plug 8. Annular seals 31 and mandrel seal 32 prevent pressurized fluid from entering gas pressure chamber 24 through the threaded connection between housings 18 and 19.

Front valve 6 is substantially identical in structure to center valve 4 except that when coil spring 46 in valve 6 is fully extended in a low pressure environment, valve 6 is in a continuously closed position. This is achieved by having one or more ports 36 in mandrel 37 located to the right of recess 38 and seal 40 in housing 39. Bore passage 41 communicates fluid from bore 17 to ports 36. One or more ports 42 in housing 39 communicate recess 38 to the interior of pipeline 15.

One or more ports 43 through the wall of seal member extension 44 attached to seal member 2, allows fluid from valve 4 to communicate continuously with bore passage 45 and thus with bore passage 17.

Swivel connection 3 may be any readily available connection which allows 360° flexibility. The flexible connection shown consists of a common universal joint.

Figure 4:
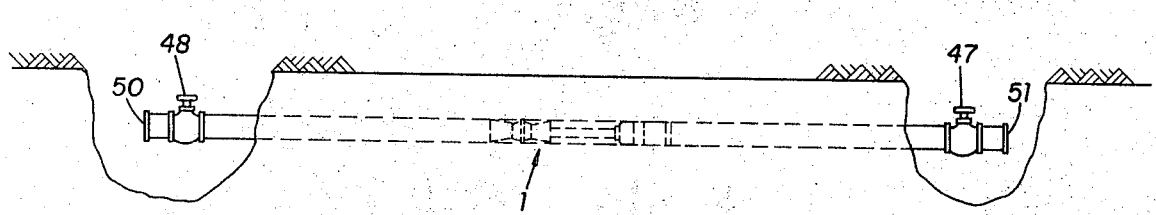
FIG. 4 is a schematic view showing the sealing plug and the section of pipeline to be tested.

In typical operation the pipeline plug 1 is initially in the state illustrated in FIG. 1. Valve 6 is biased closed by coil spring 46, and valve 4 is biased open by spring 25. The plug is placed within a section of pipeline 15 which is to be tested for leaks. Referring now to FIG. 4, pipeline valve 48 is maintained open while fluid is pumped in behind plug 1 through pipeline valve 47. Since central valve 4 is open, fluid pressure is communicated through bore 11, bore 13, valve 4, and against sealing cups 16 to establish a pressure differential across sealing cups 16 which drives the device down the pipeline to the desired location. Valve 6 is biased closed and maintains the pressure differential across the seal cups 16. When the locator plug is in the desired position which can be determined by several different methods, for instance by monitoring the amount of fluid pumped behind the plug and/or by having a radio transmitter located within the plug to signal its location, the pipeline valve 47 is closed and the empty portion of the pipeline is filled with fluid from pipeline valve 48 to the locator plug 1. This fluid is filled through pipeline valve 48 which is maintained open after valve 47 is closed. After the entire pipeline is filled with fluid, valve 48 is closed and both sections of the line are pressured to a hydrostatic pressure sufficient to push mandrels 27 and 37 to the left against coil springs 25 and 46 in gas chambers 24 and 49 which are initially substantially near atmospheric pressure. The hydrostatic pressure working through open valve 4 and through bore passages 45, 17, and 41 creates a pressure differential across mandrels 27 and 37. This pressure differential is counteracted by coil springs 25 and 46. Coil spring 46 is slightly weaker than coil spring 25 to allow valve 6 to operate prior to valve 4. Upon reaching a predetermined hydrostatic pressure, which can be adjusted beforehand by replacing springs 25 and 46 with springs of greater or lesser tension, mandrel 37 compresses spring 46 enough to align ports 36 with recess 38 which opens valve 6 and removes any possibility of a pressure differential from arising across sealing cups 16. Since the whole pipeline is being pressured equally, no differential existed across cups 16 immediately prior to the opening of valve 6 and therefore the plug has become stationary in the pipeline due to its lack of motive force.

After hydrostatic pressure reaches the predetermined limit which opens valve 6, no more pressure is applied to the left end 50 of the pipeline but the right end 51 continues to receive pressure through valve 47. Shortly thereafter spring tension in coil spring 25 is overcome by the pressure differential across mandrel 27 to chamber 24, and mandrel 27 moves to the left closing valve 4 by moving ports 34 past recess 35 and past one of the seals 32. This immediately creates a pressure differential across head 8, casing 9 and cup 12, forcing ribs 10 into contact with the pipeline 15 and firmly anchoring the seal plug in the pipeline establishing a stationary fluidically sealed barrier in the pipeline.

Fluid pressure can then be measured at valve 47 and at valve 48 to determine in which section of the pipeline the leak is located. After the leaking half of the pipeline is located, the plug 1 can be moved into this half to further narrow down the exact location of the leak. This process of halving the line and then halving each half can be repeated until the exact location of the leak is determined.

As an alternative the plug 1 can be moved down the line at substantially equal measured increments rather than using the halving process. This reduces the amount of reverse flowing of the plug in the pipeline which amount could be very substantial in the halving process and which flowing tends to be detrimental to cup 12.

Although a specific preferred embodiment of the present invention has been described in the detailed description above, the description is not intended to limit the invention to the particular forms or embodiments disclosed herein, since they are to be recognized as illustrative rather than restrictive and it will be obvious to those skilled in the art that the invention is not so limited. FOr example the coil spring biasing means in the central valve 4 and front valve 6 could be augmented or replaced by a gas chamber containing a gas under pressure such as nitrogen, which when compressed would act as a biasing means. It would also be possible to use in place of seal means 7 any type of device which expands in response to differential pressure to contact the pipeline interior surface or any device which extends gripping means such as serrated clips or abutments into gripping arrangement with the pipeline. It is also obvious to use several types of flexible joints such as links, or braided steel cable in place of universal joint 3, or to use any type of flexible or semi-flexible sealing cups in place of those shown at 16.

It is also possible to use more than one section of sealing cups with each section joined by flexible couplings. FOr relatively straight pipeline section, it would be possible to leave flexible couplings out of the device and rigidly attach seal member 2, extension 44 and central valve 4 together, to form a non-flexible shorter expandable pipeline plug. This invention could also utilize any form of hydrostatically operated biased valves to replace valves 4 and 6. Thus, this invention is declared to cover all changes and modifications of the specific example of the invention herein disclosed for purposes of illustration, which do not constitute departures from the spirit and scope of the invention.

Having thus described my invention, what I claim is:

1. Apparatus for plugging a pipeline against fluid flow comprising:
    a. a cylindrical axial member adapted to be placed longitudinally within a pipeline having fixedly attached to the exterior thereof a plurality of generally circular cross-section elastomeric sealing cups for engaging the entire cross--section of the pipeline, and having a bore passage therethrough;
    b. first valve means located in front of said cylindrical axial member and connected axially to the bore passage of said cylindrical axial member, said first valve means being closed until subjected to a predetermined fluid pressure;
    c. a flexible universal joint coupling located behind said cylindrical axial member and connected axially thereto;
    d. second valve means connected to said flexible universal joint coupling in longitudinal axial relationship, said second valve means being open until subjected to a predetermined fluid pressure; and
    e. differential pressure responsive anchor means connected to said second valve means in axial relationship, said anchor means containing a bore passage therethrough communicated with said second valve means so that when said second valve means is closed and a differential pressure applied to said anchor means said plugging apparatus is anchored in said pipeline.

2. The pipeline plugging apparatus of claim 1 wherein said first valve means and said second valve means each comprise:
    a. a tubular shaped first housing, said first housing having a closed end, an open end, and an inner annular recess therein;
    b. a tubular shaped mandrel housing connected to said first housing, said second housing having an open bore portion therethrough, a plurality of ports through the wall, and an inner annular recess communicating with said ports;
    c. an inner piston mandrel located telescopically within said housings and containing an axial bore portion partially therethrough, a plurality of ports through the wall communicating with said partial bore portion, and an annular shoulder at one end adapted to slidably fit within said recessed portion of said first housing; and
    d. biasing means within said first housing and adapted to act against said closed end of said first housing and against said piston mandrel and tending to drive said piston mandrel into its most extended position from said first housing.

3. The pipeline plugging apparatus of claim 2 wherein said biasing means in said first and second valves comprise a coil spring in each said valve.

4. The pipeline plugging apparatus of claim 3 wherein said biasing means further comprises a compressed gas, and each of said valves further comprises seal means between said mandrel and said housings to prevent fluid or gas flow therein between.

5. The pipeline plugging apparatus of claim 2 wherein said biasing means comprises compressed nitrogen gas and each of said valves further comprises seal means between said mandrel and said housings to prevent flow of gas or fluid therein between.

6. The pipeline plugging apparatus of claim 2 wherein said biasing means in said first valve exerts less force on said first valve mandrel than does said biasing means in said second valve on said second valve mandrel.

7. The pipeline plugging apparatus of claim 1 wherein said cylindrical axial member is adapted to pull said plugging apparatus through a pipeline in response to a fluid pressure differential across said cylindrical axial member and said differential pressure responsive anchor means is arranged to provide a continuous fluidic seal in said pipeline.

8. A pipeline leak locator plug capable of selectively fluidically isolating one section of pipeline from another an indefinite number of times in a repeatable sealing process said locator plug comprising:
    a. a first tubular member adapted to be interposed axially within a pipeline;

b. a second tubular member connected to said first tubular member and also adapted to be interposed axially within a pipeline;
c. means for providing motive force on said plug in response to fluid pressure in one end of the pipeline, for driving said plug down said pipeline;
d. means for anchoring said plug in said pipeline in response to fluid pressure throughout the entire pipeline; and
e. valve means adapted to actuate said motive means, and further adapted to deactivate said motive means and actuate said anchoring means at a predetermined location in the pipeline.

9. The locator plug of claim 8 wherein said valve means comprises two spring biased hydrostatic pressure operated telescopic mandrel valves and said seal means comprises elastomeric sealing cups attached to said first and second tubular members and sealingly contacting a full cross-section of the pipeline to be tested.

* * * * *